United States Patent
Kim (10) Patent No.: US 9,821,631 B2
(45) Date of Patent: Nov. 21, 2017

(54) AIR VENT DIAL FOR AUTOMOBILE

(71) Applicant: NIFCO KOREA INC., Cheonan-si, Chungcheongnam-do (KR)

(72) Inventor: Jeong Hoon Kim, Cheonan-si (KR)

(73) Assignee: NIFCO KOREA INC., Cheonan-si, Chungcheongnam-Do (KR)

( * ) Notice: Subject to any disclaimer, the term of this patent is extended or adjusted under 35 U.S.C. 154(b) by 66 days.

(21) Appl. No.: 15/038,526

(22) PCT Filed: Dec. 1, 2014

(86) PCT No.: PCT/KR2014/011629
§ 371 (c)(1),
(2) Date: May 23, 2016

(87) PCT Pub. No.: WO2015/084001
PCT Pub. Date: Jun. 11, 2015

(65) Prior Publication Data
US 2016/0297279 A1    Oct. 13, 2016

(30) Foreign Application Priority Data

Dec. 2, 2013    (KR) .................. 20-2013-0009935 U (51) Int. Cl.
*B60H 1/00*    (2006.01)
*B60H 1/34*    (2006.01)
(Continued)

(52) U.S. Cl.
CPC ....... *B60H 1/0065* (2013.01); *B60H 1/00678* (2013.01); *B60H 1/3421* (2013.01);
(Continued)

(58) Field of Classification Search
None
See application file for complete search history.

(56) References Cited

U.S. PATENT DOCUMENTS 5,584,098 A * 12/1996 Koyama .............. B60H 1/0065
16/441
6,582,293 B1 * 6/2003 Siniarski .............. B60H 1/3414
454/155
(Continued)

FOREIGN PATENT DOCUMENTS

EP    0298013 A2 *    1/1989 ............. H01H 21/50
EP    2103463 A2    9/2009
(Continued)

OTHER PUBLICATIONS

Europe Patent Office, "Search Report for European Patent Application No. 14867400.5," Jul. 4, 2017.
PCT International Search Report of PCT/KR2014/011629.

*Primary Examiner* — Alissa Tompkins
*Assistant Examiner* — Frances F Hamilton
(74) *Attorney, Agent, or Firm* — Manabu Kanesaka (57) ABSTRACT

An air vent dial for an automobile includes an air vent housing having an air path and a damper for opening or closing the air path; a dial housing provided in the air vent housing and having an opening and holding projections; and a dial assembly having a dial knob to be fitted into the opening and a rear fixing plate connected to the damper through a link member to control the opening and closing degrees of the damper. The dial housing has the holding projections at positions corresponding to opening and closing positions of the damper. The dial assembly has a dial elongated hole and fixing projection projecting inwards and contacting the holding projections while being guided and moving along the rear outer peripheral surface of the dial housing at outside of the rear fixing plate having the dial elongated hole.

2 Claims, 6 Drawing Sheets

(51) Int. Cl.
*F16K 31/44* (2006.01)
*F16K 37/00* (2006.01)
*G05G 1/10* (2006.01)

(52) U.S. Cl.
CPC .......... *F16K 31/44* (2013.01); *F16K 37/0008* (2013.01); *B60H 2001/00707* (2013.01); *B60H 2001/3478* (2013.01); *G05G 1/10* (2013.01)

(56) References Cited

U.S. PATENT DOCUMENTS

| | | | | |
|---|---|---|---|---|
| 7,997,964 | B2* | 8/2011 | Gehring | B60H 1/345 |
| | | | | 454/152 |
| 9,110,492 | B2* | 8/2015 | Puskar, Jr. | G05G 1/10 |
| 9,358,860 | B2* | 6/2016 | Park | B60H 1/3421 |
| 9,579,954 | B2* | 2/2017 | Kim | B60H 1/3421 |
| 2006/0057952 | A1* | 3/2006 | Kim | B60H 1/3428 |
| | | | | 454/155 |
| 2006/0079165 | A1* | 4/2006 | Bowler | B60H 1/00671 |
| | | | | 454/69 |
| 2008/0254731 | A1* | 10/2008 | Bowler | B60H 1/00671 |
| | | | | 454/69 |
| 2016/0114654 | A1* | 4/2016 | Lee | B60H 1/3414 |
| | | | | 454/155 |

FOREIGN PATENT DOCUMENTS

| | | | | |
|---|---|---|---|---|
| FR | 2810949 A1 | 1/2002 | | |
| GB | 2508338 A | * 6/2014 | | B60K 37/06 |
| JP | 2564573 Y2 | 3/1998 | | |
| JP | 3019713 B2 | * 3/2000 | | B60H 1/0065 |
| KR | 10-2007-0039754 A | 4/2007 | | |
| KR | 10-0710669 B1 | 4/2007 | | |
| KR | 10-2009-0120262 A | 11/2009 | | |
| KR | 10-2011-0021225 A | 3/2011 | | |
| KR | 20-0462226 Y1 | 8/2012 | | |

* cited by examiner

AIR VENT DIAL FOR AUTOMOBILE

TECHNICAL FIELD

The present invention relates to an air vent dial for an automobile, wherein the click phase of a dial assembly is improved with cost reduction and quality improvement.

BACKGROUND ART

In general, an air vent for an automobile is an air discharge means of an air conditioning system to appropriately maintain the internal temperature of an automobile, thereby controlling the discharge of air by controlling a damper provided to the inside of the air vent.

Further, the damper of the air vent is rotationally provided with a dial for controlling an air flow rate, wherein a means is provided to the rotation structure of the air vent dial such that a user can feel the click phase of the dial.

That is, if the air vent is provided with a damper control part for selectively opening or closing the damper so as to control the flow rate of the air introduced into the inside of the automobile, the damper control part includes the dial assembly and a plurality of link members for controlling the damper and the dial assembly.

Figure 1:
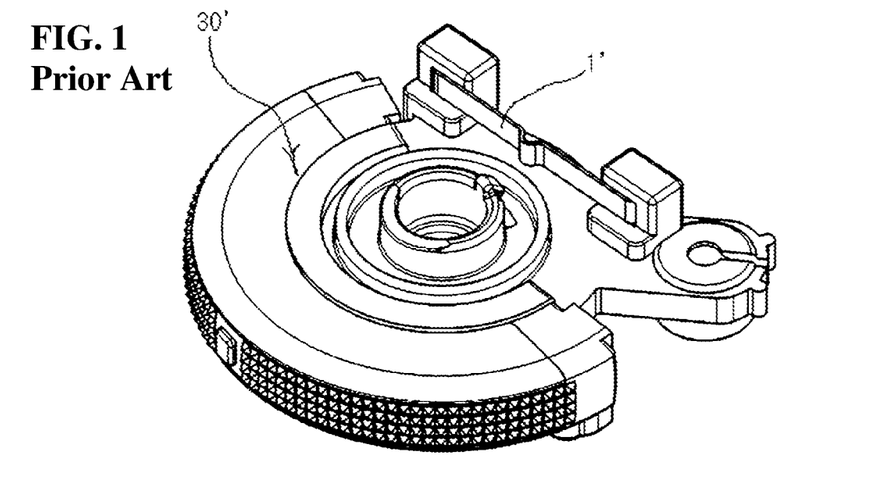
FIG. 1 is a perspective view showing the configuration of a prior art dial assembly.

In order to improve the click phase of the dial assembly according to a prior art, referring to FIG. 1, a leaf spring 1' is coupled such that the leaf spring 1' is pushed by holding projections provided to a dial housing at the time of the rotation of a dial assembly 30' so as to apply the click phase. Therefore, the leaf spring 1' is selectively fixed at a point that a user desires and controls the air flow rate of the damper.

However, the prior art described above, in which the click phase is applied by providing the leaf spring to the dial assembly by inserting the both end portions of the leaf spring into the dial assembly so as to be coupled thereto, has a disadvantage that the leaf spring is pushed by the holding projections and escapes from the dial assembly.

In addition, the leaf spring coupled to the dial assembly has another disadvantage that the coupling process is difficult in terms of the manufacturing method of metal materials, resulting in the increase of the parts cost due to the rise of manufacturing costs.

Figure 2:
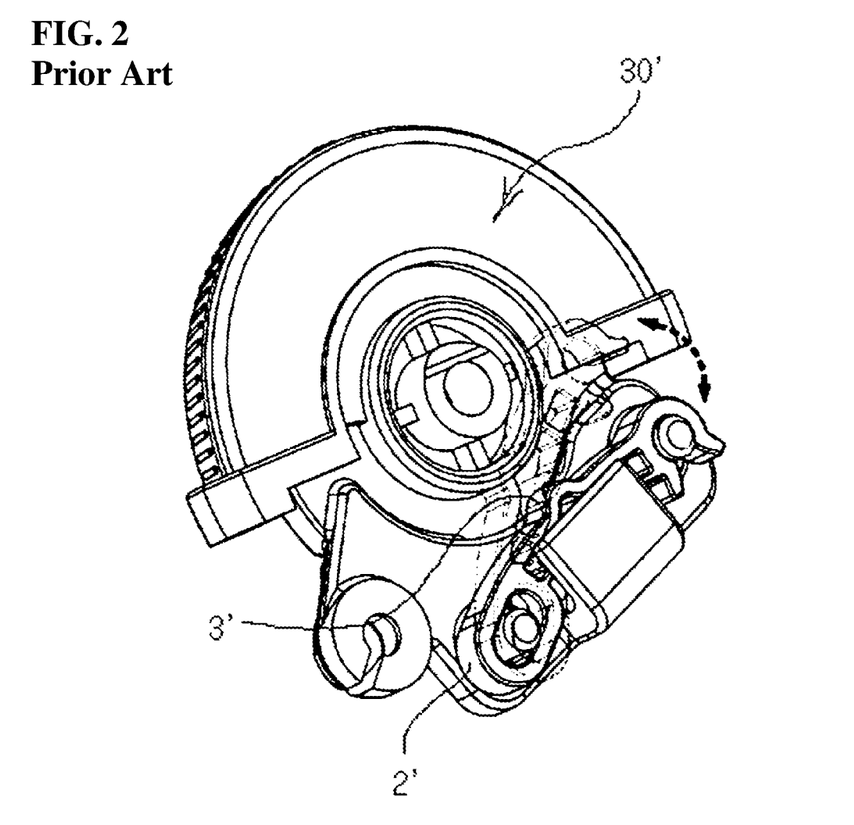
FIG. 2 is a perspective view showing the configuration of a prior art dial assembly.

Therefore, Korean utility model publication no. 20-0462226 discloses a technique for improving the click phase of a dial assembly, wherein an elastic member 40' made from a plastic material is coupled to a dial assembly 30', as shown in FIG. 2, thereby preventing the rise of manufacturing costs and improving the convenience of assembling work.

That is, the elastic member 40' of the above technique can be mainly formed in an assembling manner such that one end of the elastic member 40' is fitted into a pin in a state, in which the other end of the elastic member 40' is coupled to the dial assembly 30', or with projection portion 3' projecting from the center of a support portion 2' which connects the both ends such that the projection portion 3' is pushed by the holding projections of a dial housing.

According to the technique described above, a pin coupling hole of the one end is formed as an elongated hole and a hole of the other end is formed to be open in order to carry out the assembling of the elastic member into the dial assembly. Therefore, the technique described above still has a disadvantage that the pin of the dial assembly and the open hole of the other end are likely to separate by vibration and shock, resulting in the malfunction of a dial.

Further, according to the technique described above, the elastic member is rotated in a state, in which the one end is first pin-coupled and then the other end is fitted. Therefore, a space is required for the rotation of the elastic member in the dial assembly, resulting in the enlargement of parts and the increase of the number of required parts, thereby making the assembling work complicated.

PRIOR ART DOCUMENT

Patent Document

Patent Document 1: Korean Utility Model Publication No. 20-0462226—vehicle air vent (registered on 27 Aug. 2012)

DISCLOSURE OF INVENTION

Technical Problem

The present invention is derived in consideration of the above disadvantages and any other problems and has an objective to provide an air vent dial for an automobile, wherein the structure of a dial assembly is simplified while providing the click phase according to the rotation of a dial such that a user can sufficiently recognize the opening and closing states of an air vent.

The present invention has another objective to provide an air vent dial for an automobile, wherein the click phase is provided by the coupling of a dial assembly and a dial housing, thereby simplifying the assembling work and reducing the time required for the assembling work so as to improve workability.

Solution to Problem

In order to achieve the above and any other objectives of the present invention, an air vent dial for an automobile comprises:

an air vent housing 10 having an air path provided to an inside portion and a damper 11 rotationally provided to the air path so as to open or close the air path;

a dial housing 20 provided to the air vent housing 10 and having an opening 21 provided at a front portion thereof and holding projections 25 provided to an outer peripheral surface at a rear portion thereof; and a dial assembly 30 rotationally coupled to the dial housing 20 and having a dial knob 31 provided to a front portion so as to be fitted into the opening 21 and exposed to the outside and a rear fixing plate 32 connected to the damper 11 through a link member 12 so as to control opening and closing degrees of the damper 11, wherein the dial housing 20 has a housing elongated hole 24 formed at a rear body and holding projections 25 respectively formed at positions corresponding to the opening and closing positions of the damper 11 along a rear outer peripheral surface, and wherein the dial assembly 30 has a dial elongated hole 33 formed on the rear fixing plate 32 and a fixing projection 34 projecting inwards and coming into contact with the holding projections 25 while being guided and moving along the rear outer peripheral surface of the dial housing 20 at the outside of the rear fixing plate 32 having the dial elongated hole 33.

Further, the holding projections 25 of the housing 20 move with elastic force in the direction of the housing elongated hole 24, and the fixing projection 34 of the dial assembly 30 moves with elastic force in the outside direction of the dial elongated hole 33.

Advantageous Effects of Invention

According to the present invention in the above configuration, it is possible to provide the click phase for a user to accurately recognize the opening and closing states of the air vent according to the rotation of the dial knob simply by coupling the dial housing and the dial assembly.

Therefore, the user can accurately recognize the air blowing state of the air vent while rotating the dial knob. In addition, the dial assembly and the dial housing are made from plastic materials by injection molding, thereby simplifying the manufacturing process and reducing the manufacturing costs as well as simplifying the assembling work and reducing the assembling time.

BEST MODE FOR CARRYING OUT THE INVENTION

Hereinafter, embodiments of the present invention will now be described with respect to the configuration in detail with reference to the accompanied drawings.

An air vent dial for an automobile according to the present invention is derived to reduce parts cost and improve quality through the improvement of the click phase of the dial assembly.

Figure 3:
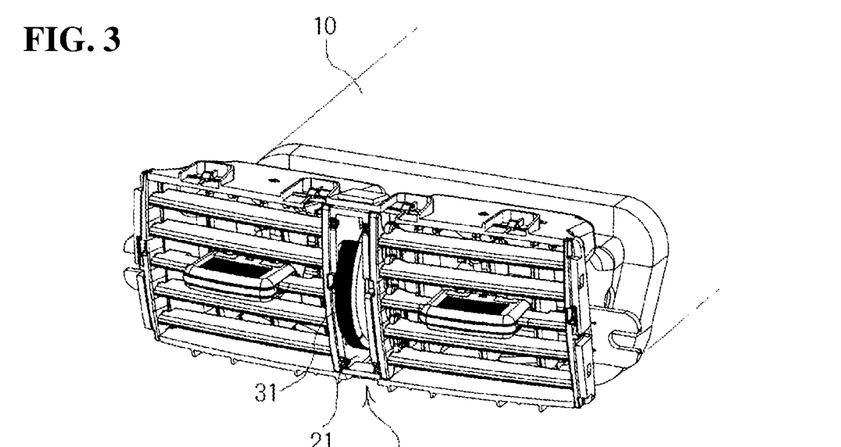
FIG. 3 is a perspective view showing the configuration of an air vent according to the present invention.
Figure 4:
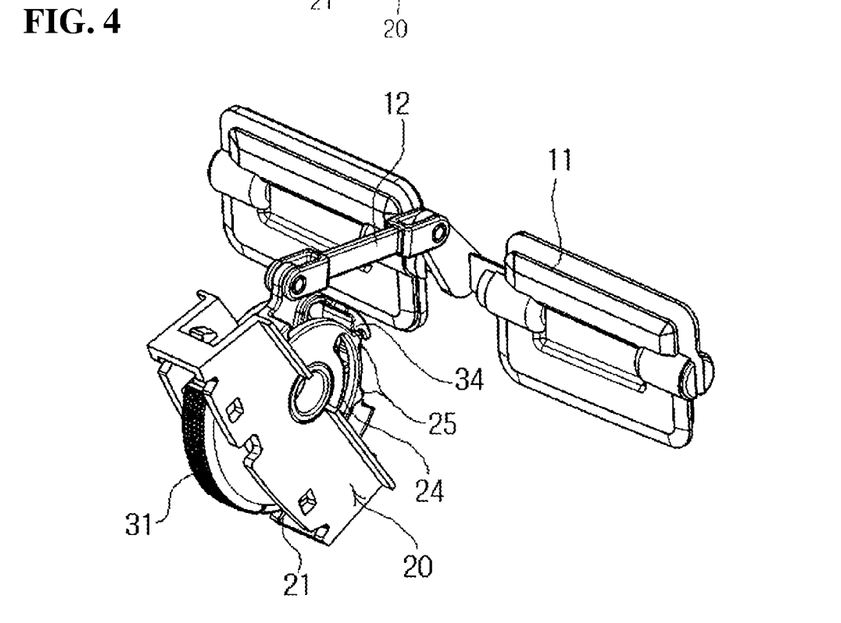
FIG. 4 is a perspective view showing a coupling state of an air vent according to the present invention.
Figure 5:
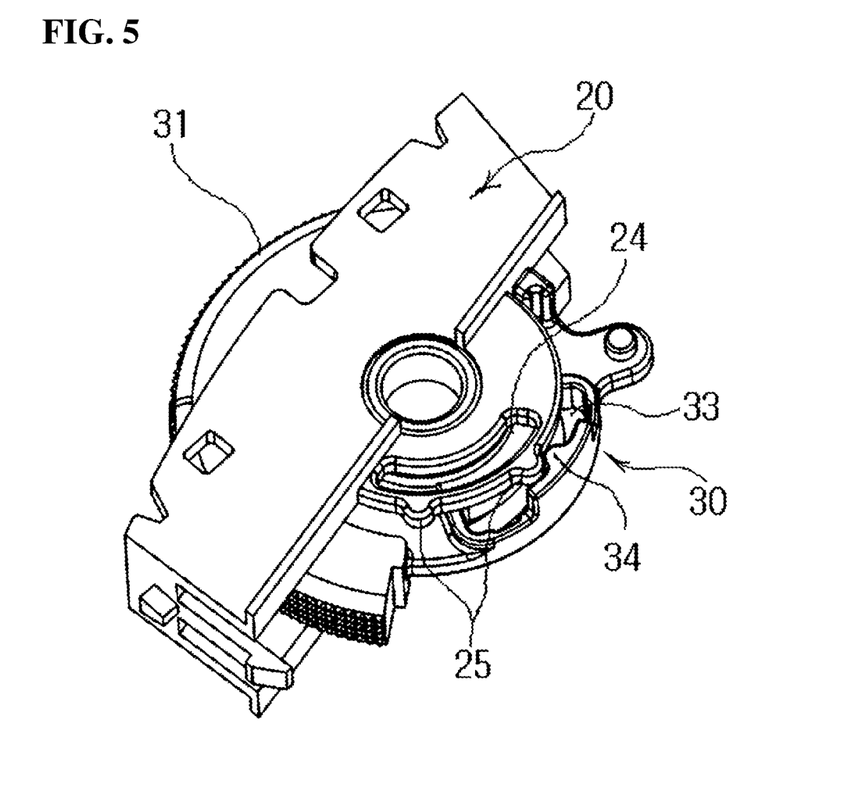
FIG. 5 is a perspective view showing a coupling state of an air vent according to the present invention.

Referring to FIG. 3 to FIG. 5, a dial knob 31 is assembled into the front surface portion of an automobile so as to be exposed, and a damper 11 is rotationally provided to an air path in an air vent housing 10 and opens or closes the air path by using the link member 12 assembled into the rear portion of the dial knob 31.

The dial assembly 30 including the dial knob 31 is coupled to the dial housing 20, and the dial housing 20 is assembled and fixed in the air vent housing 10 such that the damper 11 rotates in association with the movement of the link member 12 by the operation of the dial knob 31.

Now, explaining the above structure in more detail, the air vent housing 10 is provided with the air path therein such that the damper 11 is rotationally provided to the air path.

The dial housing 20 is provided to the air vent housing 10 and has an opening 21 formed at the front portion thereof and holding projections 25 provided to the rear outer peripheral surface thereof.

In addition, the dial assembly 30 is rotationally coupled to the dial housing 20 and has the dial knob 31 at the front portion thereof so as to be fitted into the opening 21 and exposed to the outside and a rear fixing plate 32 of which one side is connected to the damper 11 through the link member 12 so as to control the opening and closing degrees of the damper 11.

According to the present invention, by using the dial assembly 30 and the dial housing 20 and by simply coupling these two parts, a user can recognize the click phase at the time of operating the dial knob 31, thereby reducing the number of required parts and man-hour.

Figure 6:
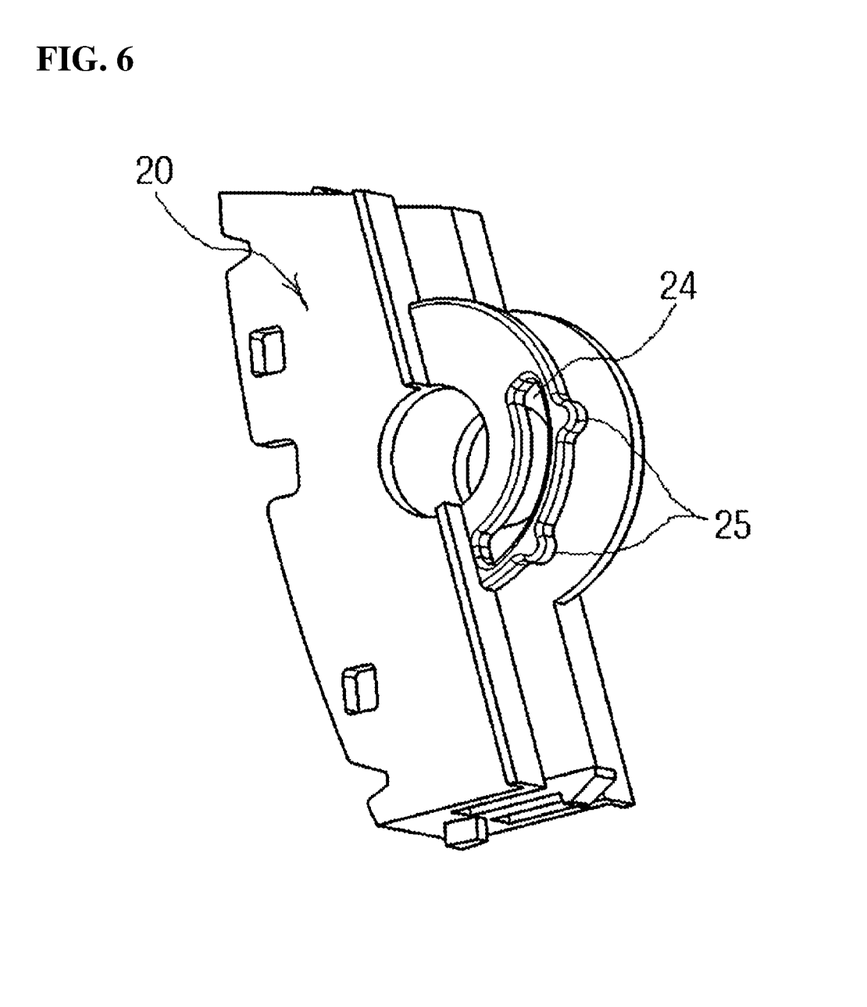
FIG. 6 is a perspective view showing a dial housing according to the present invention.

First of all, referring to FIG. 6, the dial housing 20 has a housing elongated hole 24 in a rear body and the holding projections 25 respectively formed at positions corresponding to the opening and closing positions of the damper along the rear outer peripheral surface thereof.

That is, the holding projections 25 are respectively formed to protrude from the rear outer peripheral surface thereof at positions corresponding to the opening and closing positions of the damper 11 along the rear outer peripheral surface thereof.

Further, the dial housing 20 is coupled and fixed to the air vent housing 10 and has the opening 21 formed in the front portion and a hole formed in the center portion so as to be coupled with the dial assembly 30.

Figure 7:
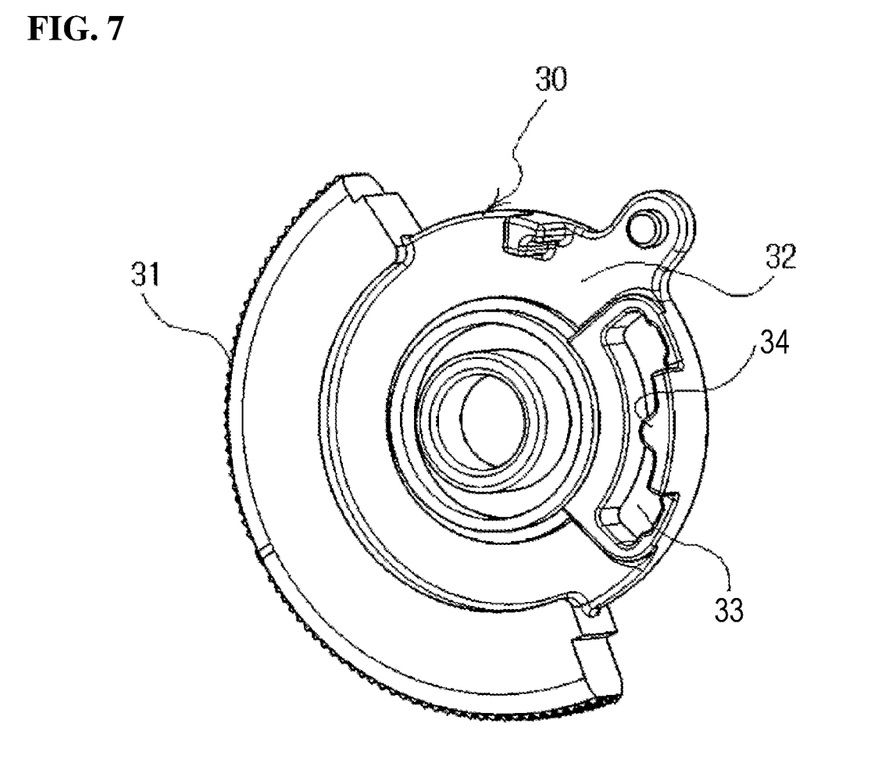
FIG. 7 is a perspective view showing an operation state of a dial assembly according to the present invention.

In addition, referring to FIG. 7, the dial assembly 30 is rotationally coupled to the dial housing 20 in the center portion thereof and has the dial knob 31 provided to the front portion thereof and fitted into the opening 21 so as to be exposed to the outside, the rear fixing plate 32 extending from the rear portion thereof and provided with an elongated hole 33 and the fixing projection 34 projecting inwards and coming into contact with the holding projections 25 while being guided and moving along the rear outer peripheral surface of the dial housing 20 at the outside of the rear fixing plate 32 having the dial elongated hole 33.

Further, the dial assembly 30 is coupled to one end of the link member 12 connected to the damper 11 at one side such that the link member 12 moves in response to the rotation of the dial assembly 30 so as to control the opening and closing degrees of the damper 11.

Meanwhile, the holding projections 25 of dial housing 20 move with elastic force in the direction of the housing elongated hole 24. Further, the fixing projection 34 of the dial assembly 30 is formed on the outside of the rear fixing plate 32 and has the dial elongated hole 33 in the inside direction of the fixing projection 34, such that the outside of the rear fixing plate 32 provided with the fixing projection 34 is formed to have relatively small thickness and elasticity so as to move with elastic force in the outside direction.

Figure 8:
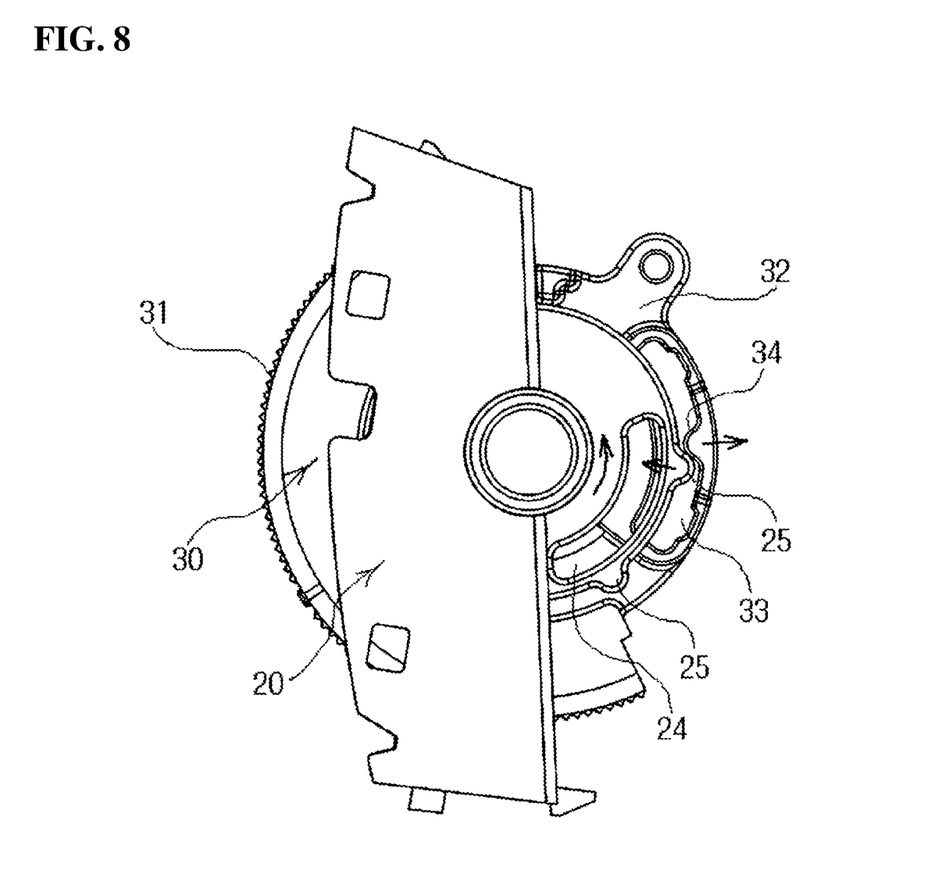
FIG. 8 is a side view showing an operation state of the dial assembly according to the present invention.

Therefore, referring to FIG. 8, if the dial knob 31 is rotated in a state, in which the dial assembly 30 is coupled to the dial housing 20, the fixing projection 34 of the rear portion rotates along the outer peripheral surface of the dial housing 20 and comes into contact with the holding projections 25 of the opening or closing positions.

At this time, if the dial knob 31 is further rotated, the fixing projection 34 and the holding projections 25 are pushed by each other and the fixing projection 34 passes the holding projections 25.

That is, the holding projections 25 of the dial housing 20 are pushed with the elastic force in the direction of the housing elongated hole 24, and the fixing projection 34 of the dial assembly 30 is pushed with the elastic force in the outside direction as the dial assembly 30 has the rear fixing plate 32 which has the elastic force by the dial elongated hole 33.

Therefore, in a state, in which the dial knob 31 is further rotated such that the fixing projection 34 which is pushed back by the elastic force passes the holding projections 25, the fixing projection 34 and the holding projections 25 are restored to the initial states thereof and the user can feel the click phase.

Meanwhile, the dial housing 20 and the dial assembly 30 are made from plastic materials and the fixing projection 34 and the holding projections 25 have the elastic force by the housing elongated hole 24 and the dial elongated hole 33 such that no noise can be generated in the process of contact and deformation.

Therefore, selective fixing can be realized at a position desired by the user at the time of rotating the dial knob 31 such that the user can control the air flow rate according to the opening and closing of the damper 11.

Hereinafter, embodiments of the present invention structured as above will now be explained in more detail.

First, if the user rotates the dial knob 31 which is axially coupled to the dial housing 20, the link member 12 assembled with the rear fixing plate 32 of the dial knob 31 moves together therewith.

At this time, the other end of the link member 12 is connected to the damper 11 such that the damper 11 in the air vent housing 10 rotates by the rotation of the dial knob 31 so as to open or close the air path.

In addition, the fixing projection 34 is in a contact state with the body rear outer peripheral surface of the dial housing 20 and moves along the body rear outer peripheral surface of the dial housing 20 in a state, in which the dial assembly 30 according to the present invention is coupled and fixed to the dial housing 20.

That is, the fixing projection 34 rotates together with the dial knob 31 in a state, in which the fixing projection 34 is in contact with the outer peripheral surface of the dial housing 20, and passes the holding projections 25 which are formed to project from the outer peripheral surface of the dial housing 20 at the position where the damper 11 is closed.

At this time, the fixing projection 34 and the holding projections 25 are formed to have the elastic force so as to come into contact with each other and be pushed back from each other. Therefore, the fixing projection 34 passes the holding projections 25 and is restored.

Therefore, the user can recognize the click phase indicating that the damper 11 is closed when rotating the dial knob 31 and can also recognize the click phase as the fixing projection 34 passes the holding projections 25 even when the damper 11 is opened by rotating the dial knob 31 in the opposite direction.

Herein, it is preferable that the holding projections 25 of the dial housing 20 and the fixing projection 34 of the dial assembly 30 are formed to be rounded such that the holding projections 25 can naturally pass the fixing projection 34.

The embodiments described above are to be understood as a few illustrative examples of the present invention and the present invention is not limited to the embodiments and the drawings. It will be understood by those skilled in the art that various modifications, combinations and changes may be made to the embodiments without departing from the scope of the present invention.

BRIEF EXPLANATION OF REFERENCE SYMBOLS

10: Air vent housing 11: Damper
12: Link member 20: Dial housing
24: Housing elongated hole 25: Holding projections
30: Dial assembly 31: Dial knob
32: Rear fixing plate 33: Dial elongated hole
34: Fixing projections

The invention claimed is:

1. An air vent dial for an automobile, comprising:
an air vent housing having an air path at an inside portion and a damper rotationally provided at the air path so as to open or close the air path;
a dial housing provided in the air vent housing and having an opening formed at a front portion thereof; and
a dial assembly rotationally coupled to the dial housing and having a dial knob provided at a front portion of the dial assembly so as to be fitted into the opening and exposed to outside, and a rear fixing plate connected to the damper through a link member to control opening and closing degrees of the damper,
wherein the dial housing further comprises
a housing elongated hole formed in a rear body, and
holding projections formed respectively at a rear outer peripheral surface corresponding to opening and closing positions of the damper along the rear outer peripheral surface of the dial housing, and
wherein the dial assembly further comprises
a dial elongated hole formed in the rear fixing plate, and
a fixing projection projecting inwards and contacting the holding projections while being guided and moving along the rear outer peripheral surface of the dial housing outside the rear fixing plate.

2. The air vent dial for an automobile according to claim 1, wherein the holding projections of the housing move with an elastic force in a direction of the housing elongated hole, and
the fixing projection of the dial assembly moves with an elastic force in an outside direction of the dial elongated hole.

* * * * *